Figure 1:
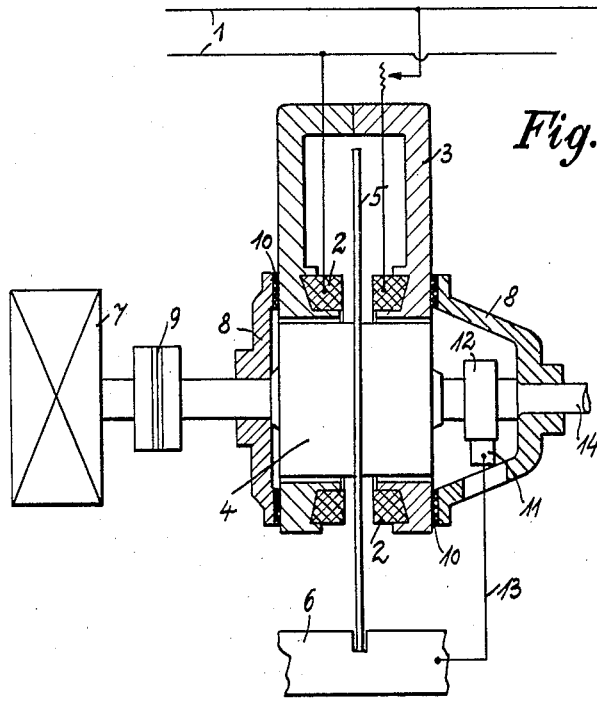

March 1, 1927.

O. H. L. NEISS 1,619,627

METHOD AND APPARATUS FOR ELECTRICALLY CUTTING METAL

Filed Nov. 28, 1925

Inventor
O. H. L. Neiss
by Langner, Parry, Card & Langner
Att'ys.

Patented Mar. 1, 1927.

1,619,627

UNITED STATES PATENT OFFICE.

OSKAR HERMANN LEOPOLD NEISS, OF HAMBURG, GERMANY, ASSIGNOR TO ELEKTRO-TRENNMASCHINEN GESELLSCHAFT MIT BESCHRÄNKTER HAFTUNG, OF HAMBURG, GERMANY.

METHOD AND APPARATUS FOR ELECTRICALLY-CUTTING METAL.

Application filed November 28, 1925, Serial No. 72,061, and in Germany July 24, 1925.

The present invention relates to cutting metal by the aid of electrodes in the shape of disks operating as rapid friction saws. The novelty resides in this that the electric current to be supplied to the cutting place is generated by induction in the rotating disklike electrode itself. As means for carrying out the method particularly a unipolar generator is well adapted, the rotor of which is formed directly by the disklike electrode, the current produced being collected on the one hand at the periphery of the disk and on the other hand at the spindle of the disk electrically connected with the work piece.

In the drawing by way of example an apparatus is shown for carrying out the invention.

Figure 2:
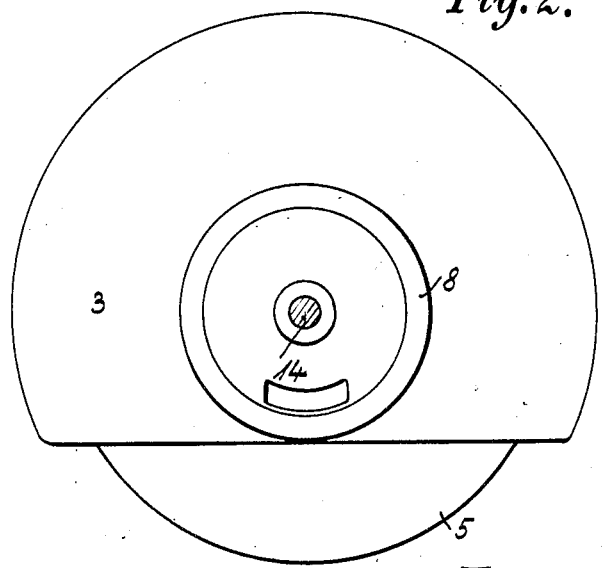

Fig. 1 is a vertical section, and
Fig. 2 an end view of the apparatus.

The current producer consists of a unipolar generator, the winding 2 of which is separately excited from the netting or main line 1 and mounted on an iron yoke 3, and the rotor 4 of which carries the disklike electrode 5 which acts on its periphery against the workpiece 6. The rotor 4 is driven by an electromotor 7 and journaled in brackets 8. It is preferably insulated from the ground for instance an insulating disk 9 being inserted in the electromotor drive of the rotor as well as insulating disks 10 being inserted between the bearing brackets 8 and the grounded iron yokes 3. The current is collected on the one hand on the periphery of the disk 5 and on the other hand by the aid of a brush 11 which slides on a slide ring 12 of the spindle 14 of the rotor, which spindle is connected to the disklike electrode 5 as well as to the workpiece by a cable 13. The iron yoke 3 serves directly as a protective casing for the disk 5, which is encased by it only partly.

This mode of construction is very simple and effective, since it makes it unnecessary to supply the electric cutting current to the disklike electrode 5 indirectly, the current being produced in the electrode itself by induction. The brush 11 might be constructed to form a second friction disk in case it is intended to cut out a part out of the workpiece corresponding in breadth or length to the distance between the two friction disks. Instead of the separately excited winding a self excited shunt winding or series winding may be used. Under certain circumstances the generator may be moreover provided with a differential compound winding, however, generally spoken this will be unnecessary, because the outer circuit has sufficient resistance to make the machine safe against short circuit. The exciter yoke 5 at the same time serves as protective casing and the cutting disk at the same time produces airing.

The moving forward of the cutting disk may be regulated by having the number of revolutions of an electromotor arranged for effecting the moving forward dependent on the charging rate of the motor 7 driving the generator. That is, the current to the motor which controls the feed, can act on a solenoid which is arranged to mechanically control a speed regulator of the motor causing the forward movement of the slide carrying the cutting disk. Thus the regulation is so carried out that when the charging rate of the current to the driving motor rises, owing to an increased friction produced by an excessive pressure of the disk 5 against the workpiece, such increase of the current charge results in throttling the rotation of the feed control motor.

I claim:—

1. A method for cutting metal by the aid of disk-like electrodes constructed similar to a rapid friction saw characterized in that the electric current supplied to the cutting place is generated by induction in the rotating disklike electrode.

2. An apparatus for cutting metal comprising a disklike electrode, means to generate an electric current by induction in the rotating disklike electrode, said disklike electrode constructed to act as rotor or a part of the rotor of a unipolar generator, means to collect the generated current on the one hand at the periphery of the disk and on the other hand at the spindle of the disk electrically connected with the disk and with the workpiece.

3. An apparatus according to claim 2 characterized in that the disklike electrode rotates between the two exciter windings of the unipolar generator and within an iron yoke surrounding the disk partly like a casing and that the workpiece is in electric connection with a brush sliding on the spindle of the rotor outside of the iron yoke.

4. An apparatus according to claim 2 characterized in that the disklike electrode constructed similar to a friction saw rotates between the two exciter windings of a unipolar generator and within an iron yoke surrounding the disk partly like a casing and that the working piece is in electric connection with a brush on the spindle of the rotor outside the iron yoke, said brush being constructed similar to a second friction saw.

5. An apparatus according to claim 2 characterized in that the number of revolutions of an electromotor effecting the forward feed of the cutting disk is made dependent on the charging rate of the driving motor of the generator thereby that an increase of the current charge of the driving motor owing to increased working pressure of the motor effecting the forward movement results in reducing the number of revolutions.

6. A current producing apparatus for electrically treating or working upon (welding or cutting) metal such as claimed in claim 2 characterized by a rotary tool adapted to operate on the metal and directly mounted on the spindle of the non-insulated rotor, while the work piece is in connection with the brushes or with the casing electrically connected with the brushes either by the earth or by a cable.

In testimony whereof I have signed my name to this specification.

OSKAR HERMANN LEOPOLD NEISS.